United States Patent
Winn et al.

(10) Patent No.: US 9,915,171 B2
(45) Date of Patent: Mar. 13, 2018

(54) COOLING PASSAGES FOR A MID-TURBINE FRAME

(71) Applicant: UNITED TECHNOLOGIES CORPORATION, Hartford, CT (US)

(72) Inventors: Joshua Daniel Winn, Ellington, CT (US); Anthony P. Cherolis, Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 470 days.

(21) Appl. No.: 14/598,474

(22) Filed: Jan. 16, 2015

(65) Prior Publication Data

US 2016/0208646 A1 Jul. 21, 2016

(51) Int. Cl.
| | | |
|---|---|---|
| *F01D 25/14* | (2006.01) | |
| *F01D 25/12* | (2006.01) | |
| *F01D 25/24* | (2006.01) | |
| *F01D 25/16* | (2006.01) | |
| *F01D 9/06* | (2006.01) | |

(52) U.S. Cl.
CPC ............. *F01D 25/14* (2013.01); *F01D 9/065* (2013.01); *F01D 25/12* (2013.01); *F01D 25/162* (2013.01); *F01D 25/24* (2013.01); *F05D 2220/32* (2013.01)

(58) Field of Classification Search
CPC ............... F01D 9/065; F01D 9/06; F01D 7/12
See application file for complete search history.

(56) References Cited

U.S. PATENT DOCUMENTS

| | | | | |
|---|---|---|---|---|
| 5,272,869 A | * | 12/1993 | Dawson | ................... F01D 9/042 415/142 |
| 7,195,447 B2 | | 3/2007 | Moniz et al. | |
| 7,530,370 B2 | * | 5/2009 | Gross | ...................... B63B 13/02 114/198 |
| 8,061,969 B2 | | 11/2011 | Durocher et al. | |
| 8,091,371 B2 | | 1/2012 | Durocher et al. | |
| 2002/0050260 A1 | * | 5/2002 | Harvey | .................. F01N 13/10 123/184.21 |
| 2006/0093465 A1 | | 5/2006 | Moniz et al. | |
| 2008/0134687 A1 | | 6/2008 | Kumar et al. | |
| 2010/0135770 A1 | | 6/2010 | Durocher et al. | |
| 2011/0079019 A1 | | 4/2011 | Durocher et al. | |
| 2011/0081237 A1 | | 4/2011 | Durocher et al. | |

(Continued)

FOREIGN PATENT DOCUMENTS

| | | |
|---|---|---|
| EP | 2565395 | 3/2013 |
| EP | 2573329 | 3/2013 |

OTHER PUBLICATIONS

Farwest Corrosion Control Company, Isolation Union Ground Joint, Jul. 26, 2014, Wayback Machine.*

(Continued)

*Primary Examiner* — Richard Edgar
*Assistant Examiner* — John S Hunter
(74) *Attorney, Agent, or Firm* — Carlson, Gaskey & Olds, P.C.

(57) ABSTRACT

A mid-turbine frame for a gas turbine engine includes an outer frame case and an inner frame case. At least one spoke connects the outer frame case to the inner frame case. The spoke includes a cooling airflow passage that extends in a radial direction and an axial direction, an elongated cylindrical portion, and a flange.

19 Claims, 6 Drawing Sheets

(56) References Cited

U.S. PATENT DOCUMENTS

| | | | |
|---|---|---|---|
| 2013/0052006 A1* | 2/2013 | Petty | F01D 25/24 415/213.1 |
| 2013/0094951 A1 | 4/2013 | McCaffrey | |
| 2013/0219919 A1 | 8/2013 | Suciu et al. | |
| 2014/0102110 A1 | 4/2014 | Farah et al. | |

OTHER PUBLICATIONS

Slovakov, Nov. 7, 2014, StackExchange.*
Extended European Search Report for European Application No. 16151371.8 dated May 20, 2016.

* cited by examiner

US 9,915,171 B2

COOLING PASSAGES FOR A MID-TURBINE FRAME

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a mid-turbine frame for a gas turbine engine includes an outer frame case and an inner frame case. At least one spoke connects the outer frame case to the inner frame case. The spoke includes a cooling airflow passage that extends in a radial direction and an axial direction.

In a further embodiment of the above, the at least one spoke includes an elongated cylindrical portion that extends in a radial direction forming an inlet passage that includes a branch that extends in an axial direction.

In a further embodiment of any of the above, there is a flange on a radially inner end of the cylindrical portion. The flange includes a pair of fastener openings on a downstream end and a single fastener opening on an upstream end.

In a further embodiment of any of the above, the single fastener opening on the upstream end is located at least partially circumferentially between the pair of fastener openings on the downstream end.

In a further embodiment of any of the above, the single fastener opening on the upstream end is located entirely circumferentially between the pair of fastener openings on the downstream end.

In a further embodiment of any of the above, a perimeter of the flange is defined by a downstream edge, a first angled portion and a second angled portion.

In a further embodiment of any of the above, the first angled portion extends at between approximately 28 and 58 degrees relative to the axial direction. The second angled portion extends at between approximately 17 and 47 degrees relative to the axial direction.

In a further embodiment of any of the above, there is a fitting connecting the cooling airflow passage to the inner frame case. The fitting includes a transfer tube that connects the at least one spoke to a cup boss. The transfer tube is fixed relative to at least one spoke and moveable relative to the cup boss.

In a further embodiment of any of the above, a swirler tube is connected to the fitting for directing cooling airflow in a direction of rotation of a low pressure rotor.

In a further embodiment of any of the above, at least one buttress extends between an outer surface 98 of at least one spoke and a flange of at least one spoke.

In another exemplary embodiment, a gas turbine engine includes a-mid turbine frame located axially between a first turbine and a second turbine. The mid-turbine frame includes an outer frame case and an inner frame case. At least one spoke connects the outer frame case to the inner frame case. The spoke includes a cooling airflow passage that extends in a radial direction and an axial direction.

In a further embodiment of any of the above, at least one spoke includes an elongated cylindrical portion that extends in a radial direction and forms an inlet passage including a branch that extends in an axial direction.

In a further embodiment of any of the above, there is a flange on a radially inner end of the cylindrical portion. The flange includes a pair of fastener openings on a downstream end and a single fastener opening on an upstream end.

In a further embodiment of any of the above, the single fastener opening on the upstream end is located at least partially circumferentially between the pair of fastener openings on the downstream end.

In a further embodiment of any of the above, the single fastener opening on the upstream end is located entirely circumferentially between the pair of fastener openings on the downstream end.

In a further embodiment of any of the above, a perimeter of the flange is defined by a downstream edge, a first angled portion and a second angled portion.

In a further embodiment of any of the above, the first angled portion extends at between approximately 28 and 58 degrees relative to the axial direction. The second angled portion extends at between approximately 17 and 47 degrees relative to the axial direction.

In a further embodiment of any of the above, a fitting connects the cooling airflow passage to the inner frame case. The fitting includes a transfer tube that connects at least one spoke to a cup boss. The transfer tube is fixed relative to at least one spoke and moveable relative to the cup boss.

In a further embodiment of any of the above, a swirler tube is connected to the fitting for directing cooling airflow in a direction of rotation of a low pressure rotor.

DETAILED DESCRIPTION

Figure 1:
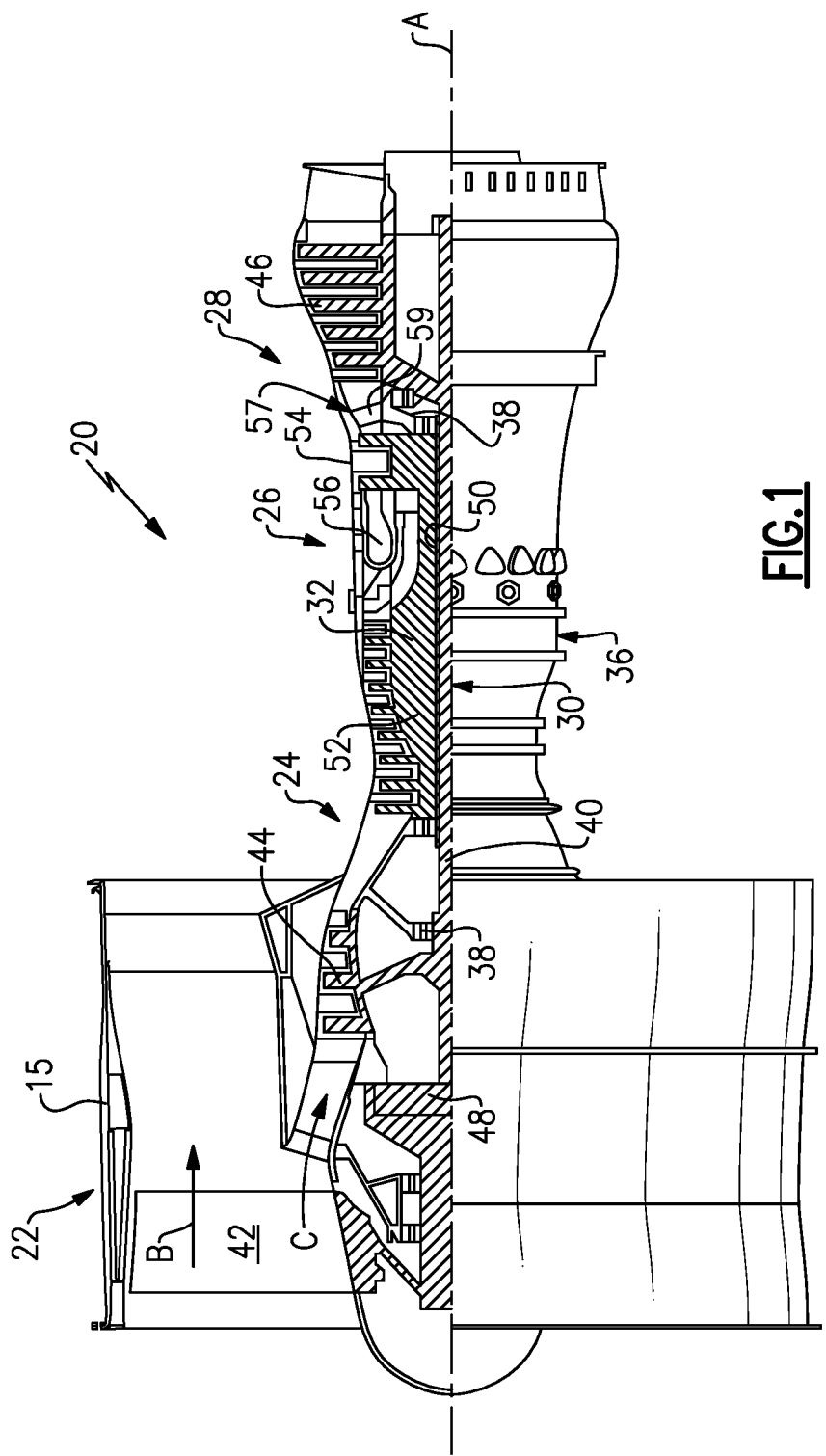
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
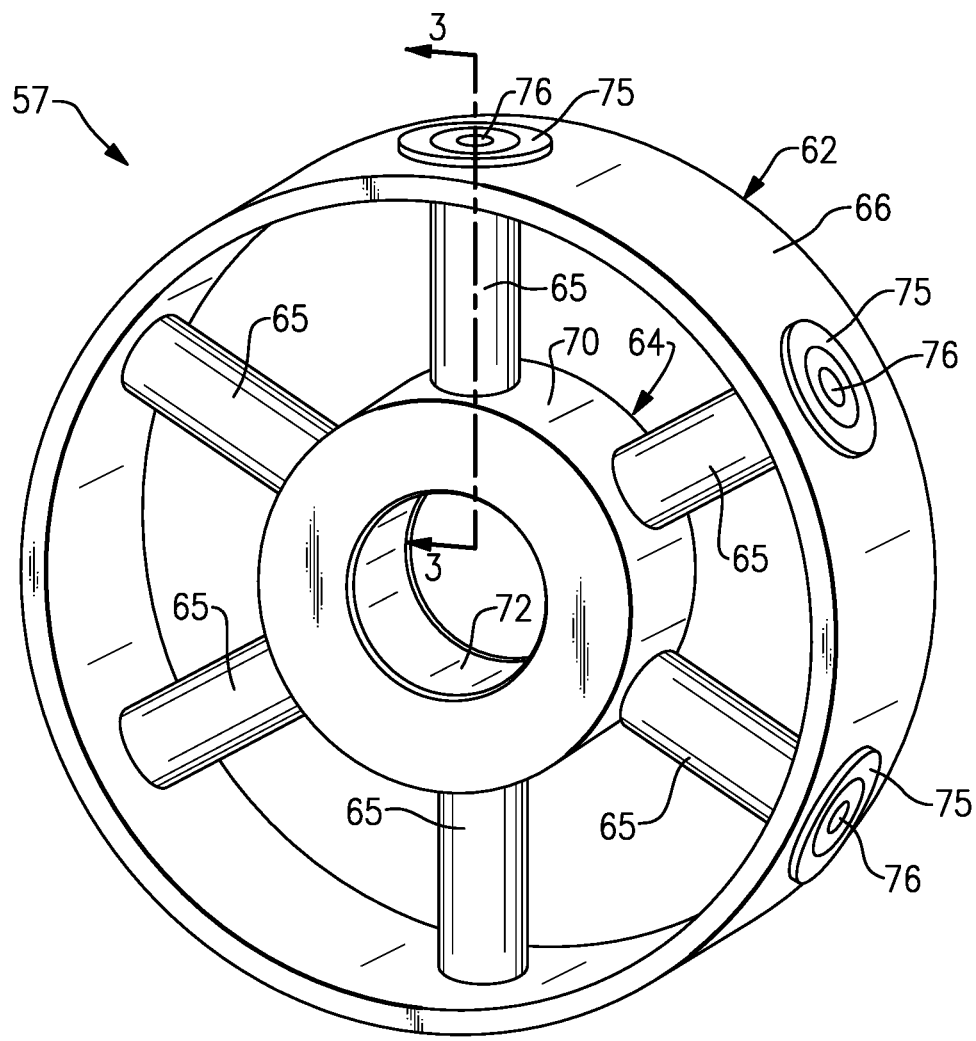
FIG. 2 is a schematic perspective view of an example mid-turbine frame in the gas turbine engine.

FIG. 2 is a schematic perspective view of one embodiment of mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed evenly around the circumference of the inner frame case 64 to provide structural support between the inner frame case 64 and the outer frame case 62. In the illustrated embodiment, each of the hollow spokes 65 is directly opposite (i.e. 180 degrees from) another of the hollow spokes 65. In alternative embodiments, the mid-turbine frame 57 can have an even number of hollow spokes greater than or less than six.

The inner frame case 64 supports the rotor assembly via the bearing systems 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearing systems 38.

Figure 3:
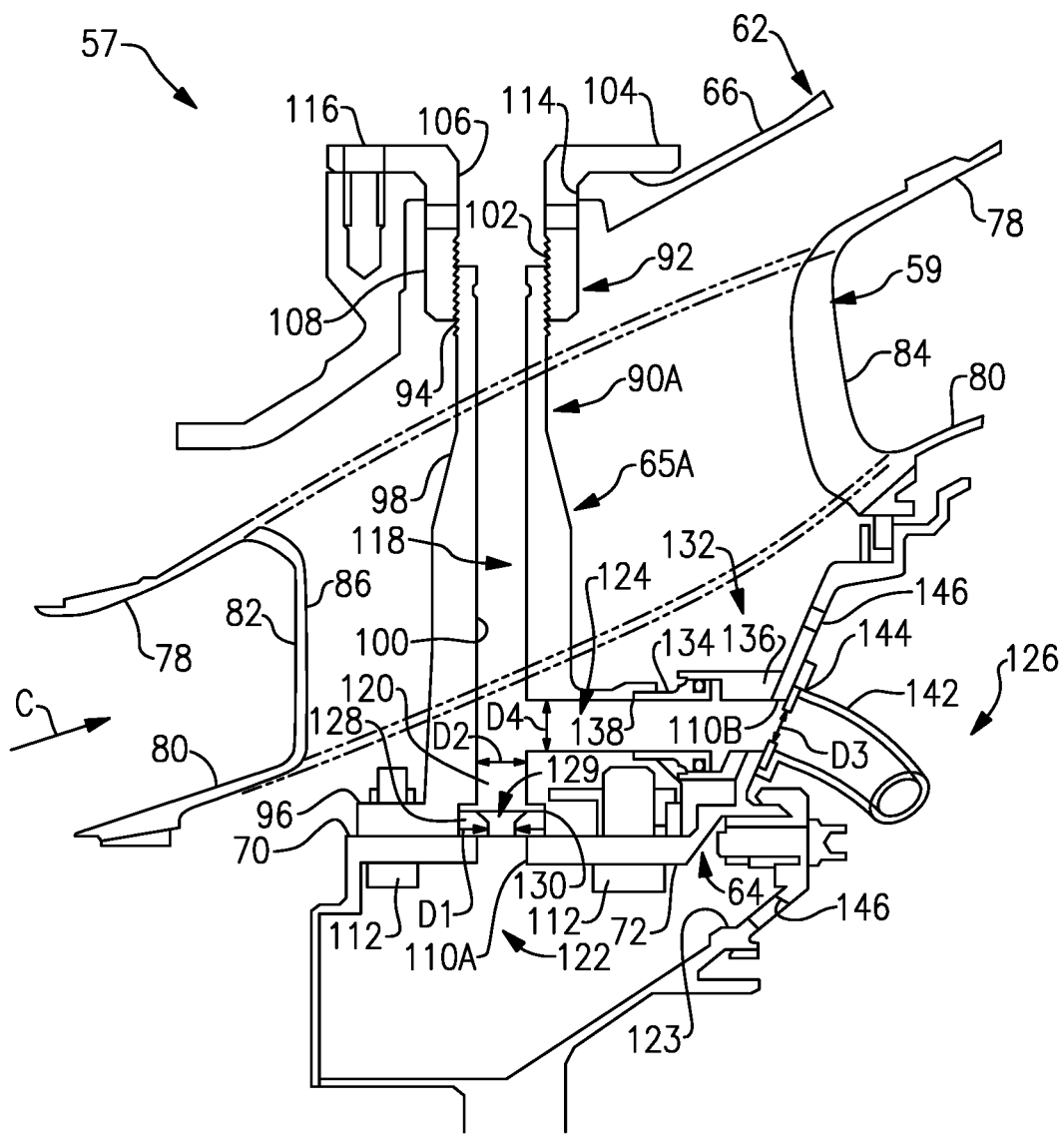
FIG. 3 is a cross section view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a circumferential direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a hole 110A in the inner frame case 64. The flange 96 is attached to the inner frame case 64 via bolts 112. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the bolts 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 branches off between a first branch 120 extending into a bearing support cavity 122 and a second branch 124 extending into a low-rotor cavity 126. The bearing support cavity 122 is at least partially defined by the inner frame case 64 and a bearing support member 123. The first branch 120 extends in a radially inward direction through the inner frame case 64.

A plug 128 is aligned with the first branch 120 and is located in an opening 130 in the hollow spoke 65A adjacent the outer diameter surface 70 of the inner frame case 64. The plug 128 includes an opening 129 having a conical radially outer portion that tapers to a cylindrical channel on a radially inner side. The cylindrical channel of the plug 128 includes a diameter D1 that is smaller than a diameter D2 defined by the inner passage surface 100. In the illustrated example, the plug 128 includes a diameter D1, however, the diameter D1 could be any dimension that is smaller than the dimension D2 in order to control the amount of cooling airflow that travels into the bearing support cavity 122. Although the plug 128 is shown contacting the hollow spoke 65a and the inner frame case 64, the plug 128 could be located anywhere within the first branch 120. Alternatively, the plug 128 could be solid and prevent the cooling airflow from entering the bearing support cavity 122 so the entire cooling airflow must travel through the second branch 124.

The second branch 124 extends in an axially downstream direction perpendicular to the first branch 120. Although the second branch 124 is shown being perpendicular to the first branch 120, the second branch 124 could be within 20 degrees of being perpendicular to the first branch 120. The second branch 124 is in fluid communication with the low rotor cavity through to a fitting 132 that extends through the inner frame case 64 and connects to a swirler tube 142.

Figure 4:
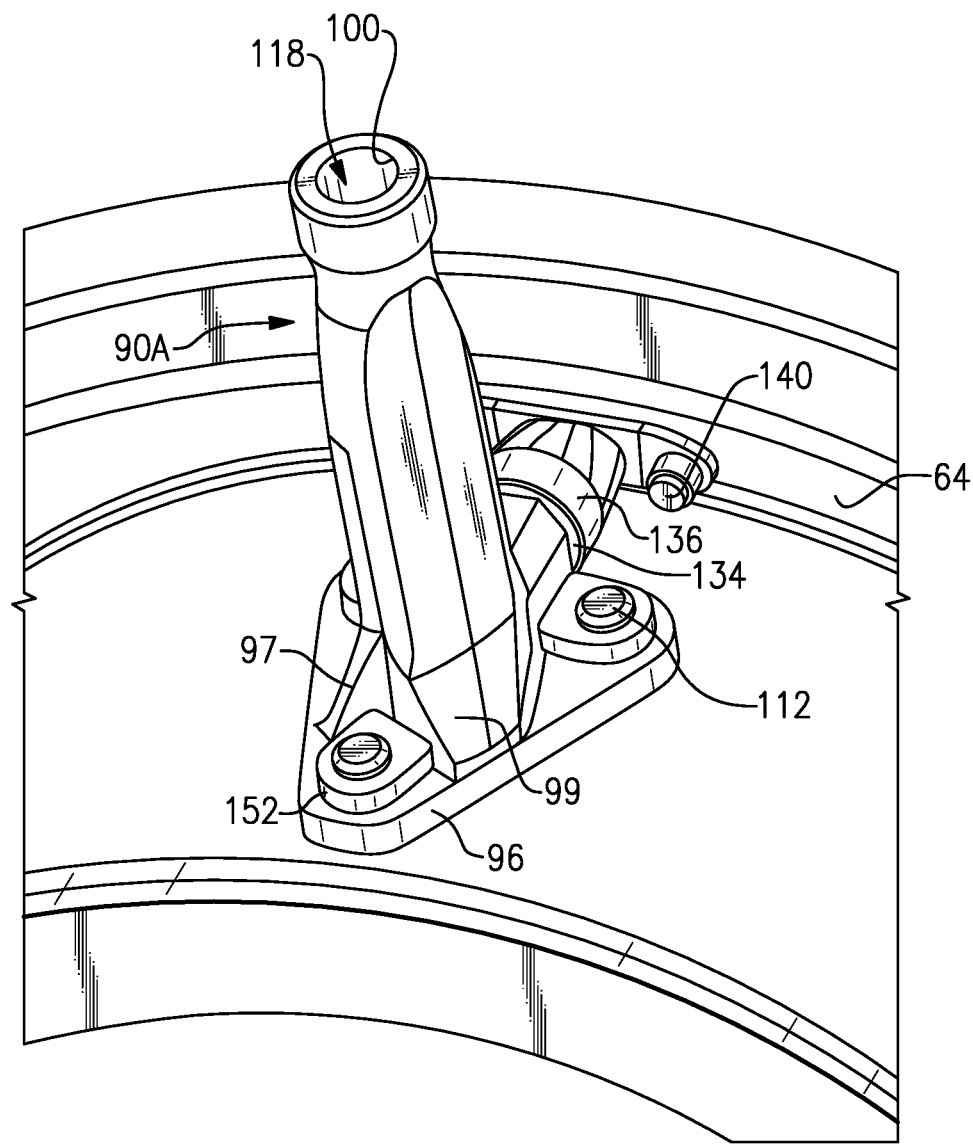
FIG. 4 illustrates a perspective view of an example I-rod.

The fitting 132 includes a transfer tube 134 pressed into an opening 138 in the hollow spoke 65A on a first end and engages a cup boss 136 on a second end. An O-ring creates a seal between an outer diameter of the transfer tube 134 and the cup boss 136. As shown in FIG. 4, the cup boss 136 is fastened to the inner frame case 64 with fasteners 140 and is aligned with a hole 110B in the inner frame case 64. The fasteners 140 also secure the swirler tube 142 to an opposite side of the inner frame case 64 from the cup boss 136. The swirler tube 142 directs the cooling airflow into the low rotor cavity in the direction of rotation of the low rotor to reduce turning and aerodynamic losses in the cooling airflow.

A restricting ring 144 is located between the swirler tube 142 and the inner diameter surface 72. The restricting ring 144 includes a diameter D3 which is smaller than a diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and the inner frame case 64, the restricting ring 144 could be located anywhere within the second branch 124 to reduce the cooling airflow into the low-rotor cavity 126. In one example, the a first portion of cooling airflow travels into the bearing support cavity 122 and a second portion of cooling airflow travels into the low-rotor cavity 126, with the second portion being greater than the first portion.

In the illustrated example, a cavity connecting opening 146 is located between the bearing support cavity 122 and the low-rotor cavity 126. The cavity connecting opening 146 may be removed or blocked to fluidly separate the bearing support cavity 122 from the low-rotor cavity 126. Separating the bearing support cavity 122 from the low-rotor cavity 126 can prevent cooling airflow mixed with oil in the bearing support cavity 122 from entering the low-rotor cavity 126.

Figure 5:
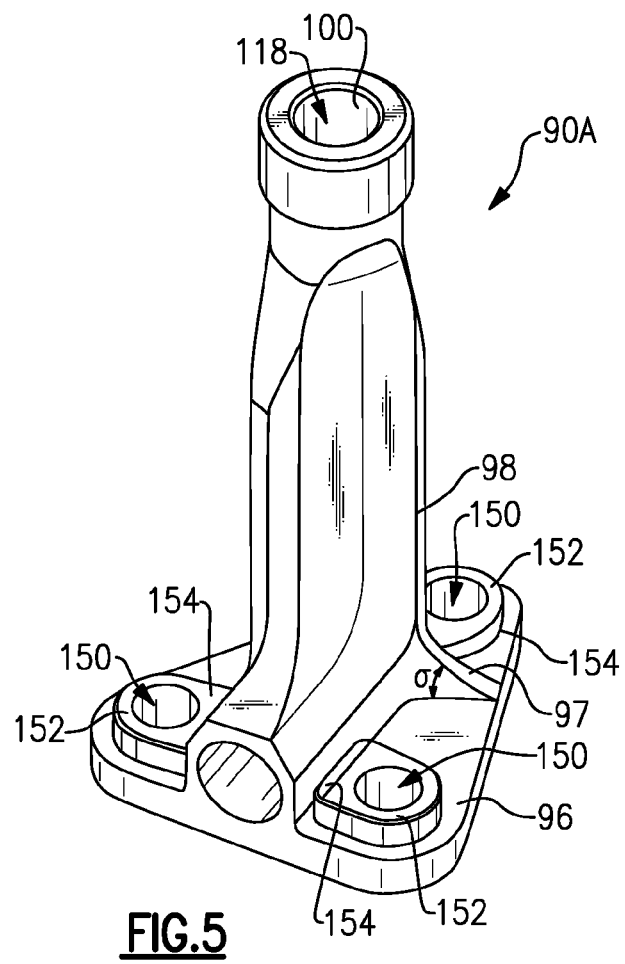
FIG. 5 illustrates another perspective view of the I-rod of FIG. 4.

FIGS. 4 and 5 illustrate a perspective view of the tie rod 90A. The tie rod 90A includes three fastener openings 150 for securing the tie rod 90A to the inner frame case 64 with the bolts 112. Bushings 152 are aligned with the fastener openings 150 and include tabs 154 that prevent rotation of the bushing 152 relative to the tie rod 90A by engaging a portion of the tie rod 90A. A first buttress 97 extends between the outer surface 98 of the tie rod 90A and the flange 96 and includes an upper surface at an angle σ relative to the flange 96. In one example, the angle σ is 56 degrees and in another example, the angle σ is between 36 and 76 degrees.

Figure 6:
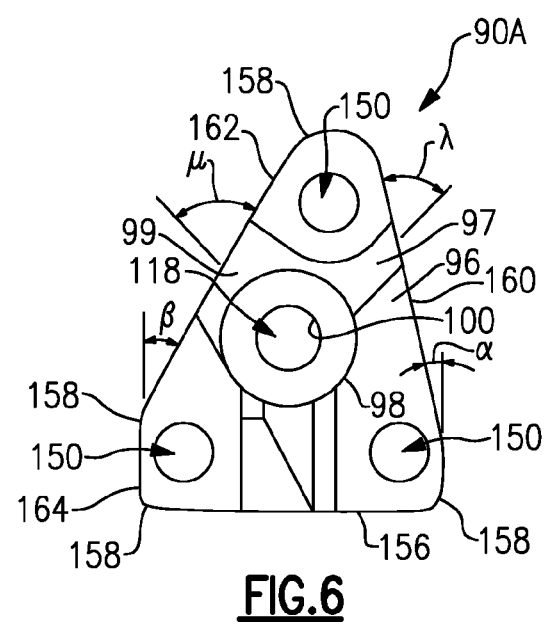
FIG. 6 illustrates a top view of the I-rod of FIG. 4.

As shown in FIG. 6, the flange 96 includes a downstream edge 156, a first angled portion 160, a second angled portion 162, and a perpendicular portion 164 that is perpendicular to the downstream edge 156. The downstream edge 156, the first angled portion 160, the second angled portion 162, and the perpendicular portion 164 are connected to each other by a plurality of rounded portions 158 and collectively form a perimeter around the flange 96. In the illustrated example, a pair of fastener openings 150 are located adjacent the downstream edge 156 and a single fastener opening 150 is located adjacent an upstream edge of the flange 96 adjacent the rounded portion 158 that connects the first angled portion 160 to the second angled portion 162. In the subject application, upstream and downstream is in reference to the engine axis A unless stated otherwise.

The single fastener opening 150 adjacent the upstream edge is at least partially circumferentially between the pair of fastener openings 150 located adjacent the downstream edge 156. In another example, the single fastener opening 150 is located entirely circumferentially between the pair of fastener openings 150. In the subject disclosure, circumferential or circumferentially is in reference to the engine axis A unless stated otherwise.

The first angled portion 160 extends at an angle α relative to a line perpendicular to the downstream edge 156 and the second angled portion 162 extends at an angle β relative to a line perpendicular to the downstream edge 156. In the illustrated example, the angle α is between approximately 28 and 58 degrees and the angle β is approximately 17 and 47 degrees.

As shown in FIG. 6, the first buttress 97 extends at an angle relative to the first angled portion 160. In the illustrated example, the angle is 59 degrees and in another example, the angle is between 28 and 90 degrees. A second buttress 99 extends at an angle μ relative to the second angled portion 162. In the illustrated example, the angle μ is 65 degrees and in another example, the angle μ is between 35 and 95 degrees.

Figure 7:
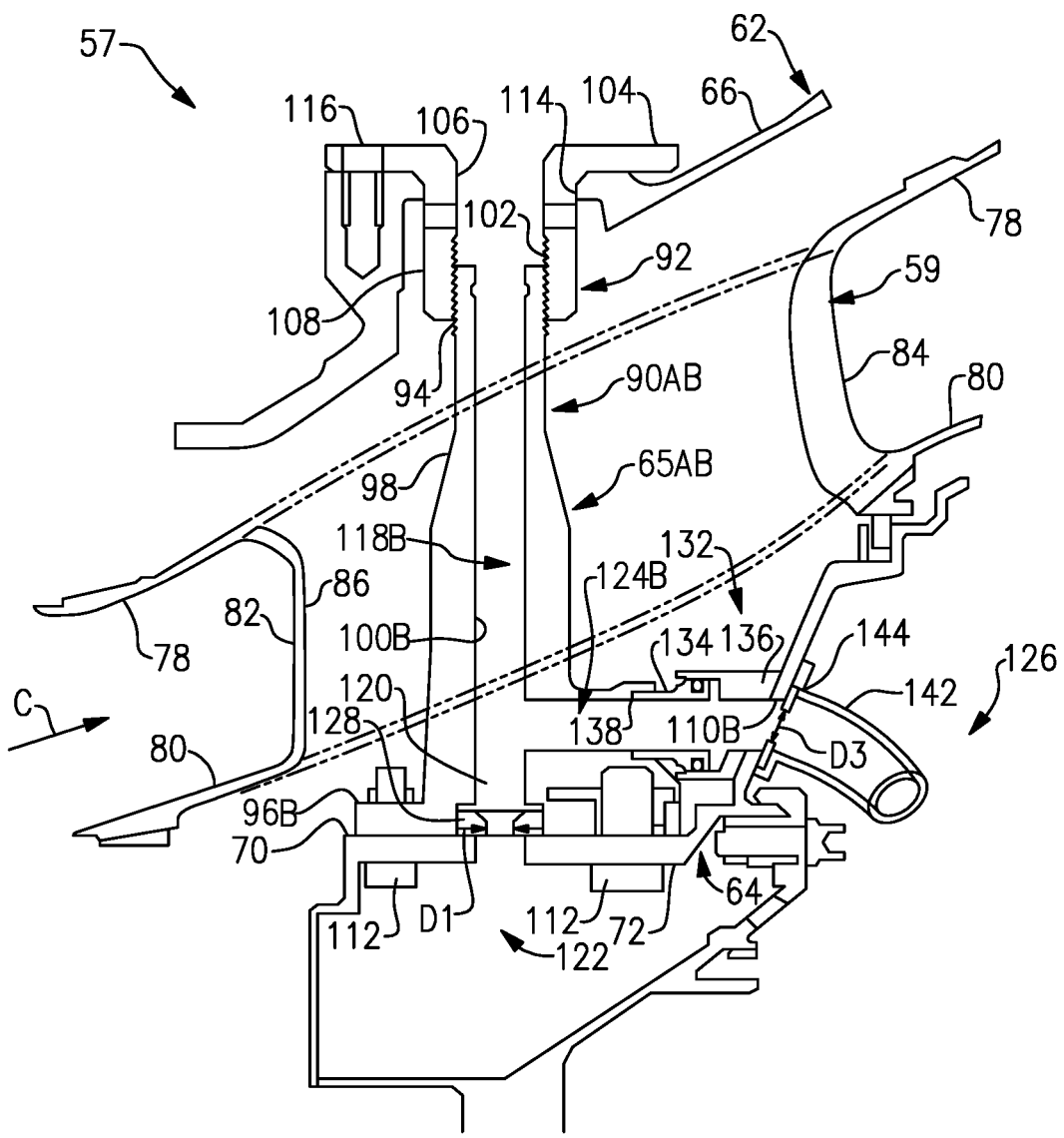
FIG. 7 a cross section view of another example mid-turbine frame.

FIG. 7 illustrates another example hollow spoke 65AB including tie rod 90AB having a flange 96B. The tie rod 90AB is similar to the tie rod 90A except where described below or shown in the Figures. An inner passage surface 100B defines an inlet passage 118B and extends radially inward and branches at a branch passage 124B extending into the low-rotor cavity 126.

The branch passage 124B extends in an axially downstream direction perpendicular to the inlet passage 118'. Although the branch passage 124B is shown being perpendicular to the inlet passage 118B, the branch passage 124B could be within 20 degrees of being perpendicular to the inlet branch 118B. The branch passage 124B is in fluid communication with the low-rotor cavity 126 through to the fitting 132 which extends through the inner frame case 64 and connects to the swirler tube 142.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A mid-turbine frame for a gas turbine engine comprising:
    an outer frame case;
    an inner frame case; and
    at least one spoke connecting the outer frame case to the inner frame case, the at least one spoke includes:
        an elongated cylindrical portion defining a cooling airflow passage extending in a radial direction forming an inlet passage with a branch extending in an axial direction; and
        a flange on a radially inner end of the cylindrical portion having a pair of fastener openings on a downstream end and a single fastener opening on an upstream end.

2. The mid-turbine frame of claim 1, wherein the single fastener opening on the upstream end is located at least partially circumferentially between the pair of fastener openings on the downstream end.

3. The mid-turbine frame of claim 1, wherein the single fastener opening on the upstream end is located entirely circumferentially between the pair of fastener openings on the downstream end.

4. The mid-turbine frame of claim 1, wherein a perimeter of the flange is defined by a downstream edge, a first angled portion, and a second angled portion.

5. The mid-turbine frame of claim 4, wherein the first angled portion extends at between 28 and 58 degrees relative to the axial direction and the second angled portion extends at between 17 and 47 degrees relative to the axial direction.

6. The mid-turbine frame of claim 1, further comprising a fitting connecting the cooling airflow passage to the inner frame case, wherein the fitting includes a transfer tube connecting the at least one spoke to a cup boss, the transfer tube is fixed relative to the at least one spoke and moveable relative to the cup boss.

7. The mid-turbine frame of claim 6, further comprising a swirler tube connected to the fitting for directing cooling airflow in a direction of rotation of a low pressure rotor.

8. The mid-turbine frame of claim 6, wherein the transfer tube is pressed into an opening in the at least one spoke on a first end and engages the cup boss fastened to the inner frame on a second end.

9. The mid-turbine frame of claim 1, further comprising at least one buttress extending between an outer surface of the at least one spoke and a flange of the at least one spoke.

10. The mid-turbine frame of claim 1, wherein the upstream end and the downstream end are in relation to a central axis of the mid-turbine frame.

11. A gas turbine engine comprising:
a mid-turbine frame located axially between a first turbine and a second turbine, the mid-turbine frame comprising:
an outer frame case;
an inner frame case; and
at least one spoke connecting the outer frame case to the inner frame case, the at least one spoke includes:
an elongated cylindrical portion defining a cooling airflow passage extending in a radial direction forming an inlet passage with a branch extending in an axial direction; and
a flange on a radially inner end of the cylindrical portion having a pair of fastener openings on a downstream end and a single fastener opening on an upstream end.

12. The gas turbine engine of claim 11, wherein the single fastener opening on the upstream end is located at least partially circumferentially between the pair of fastener openings on the downstream end.

13. The gas turbine engine of claim 11, wherein the single fastener opening on the upstream end is located entirely circumferentially between the pair of fastener openings on the downstream end.

14. The gas turbine engine of claim 11, wherein a perimeter of the flange is defined by a downstream edge, a first angled portion, and a second angled portion.

15. The gas turbine engine of claim 14, wherein the first angled portion extends at between 28 and 58 degrees relative to the axial direction and the second angled portion extends at between 17 and 47 degrees relative to the axial direction.

16. The gas turbine engine of claim 11, further comprising a fitting connecting the cooling airflow passage to the inner frame case, wherein the fitting includes a transfer tube connecting the at least one spoke to a cup boss, the transfer tube is fixed relative to the at least one spoke and moveable relative to the cup boss.

17. The gas turbine engine of claim 16, further comprising a swirler tube connected to the fitting for directing cooling airflow in a direction of rotation of a low pressure rotor.

18. The gas turbine engine of claim 16, wherein the transfer tube is pressed into an opening in the at least one spoke on a first end and engages the cup boss fastened to the inner frame on a second end.

19. The gas turbine engine of claim 11, wherein the upstream end and the downstream end are in relation to an axis of rotation of the gas turbine engine.

* * * * *